United States Patent
Fujita et al.

[11] Patent Number: 5,900,458
[45] Date of Patent: May 4, 1999

[54] CURABLE COMPOSITION BASED ON OXYPROPYLENE POLYMER

[75] Inventors: Masayuki Fujita; Michihide Honma; Hiroshi Wakabayashi, all of Hyogo, Japan

[73] Assignee: Kanegafuchi Kagaku Kogyo Kabushiki Kaisha, Osaka, Japan

[21] Appl. No.: 08/523,248

[22] Filed: Sep. 5, 1995

Related U.S. Application Data

[63] Continuation of application No. 08/207,256, Mar. 8, 1994, abandoned, which is a continuation of application No. 07/941,320, Sep. 4, 1992, abandoned.

[30] Foreign Application Priority Data

Sep. 9, 1991  [JP]  Japan .................. 3-228907

[51] Int. Cl.$^6$ .............. C08K 3/26; C08L 83/04
[52] U.S. Cl. .............. 524/788; 524/860; 524/863
[58] Field of Search .................. 524/863, 788, 524/860

[56] References Cited

U.S. PATENT DOCUMENTS

| | | | |
|---|---|---|---|
| 3,971,751 | 7/1976 | Isayama et al. | 524/849 |
| 4,049,593 | 9/1977 | Sato et al. | 260/2.5 E |
| 4,463,115 | 7/1984 | Hirose et al. | 525/403 |
| 4,507,469 | 3/1985 | Mita et al. | 525/446 |
| 4,618,653 | 10/1986 | Kawakukbo et al. | 525/404 |
| 4,618,656 | 10/1986 | Kawakubo et al. | 525/404 |
| 4,735,829 | 4/1988 | Hirose et al. | 525/106 |
| 4,963,626 | 10/1990 | Hirose et al. | 525/403 |
| 4,983,700 | 1/1991 | Yukimoto et al. | 525/407 |
| 5,011,900 | 4/1991 | Yukimoto et al. | 525/477 |

FOREIGN PATENT DOCUMENTS

| | | |
|---|---|---|
| 0 217 626 | 4/1987 | European Pat. Off. . |
| 0 390 647 | 10/1990 | European Pat. Off. . |
| 0 397 036 | 11/1990 | European Pat. Off. . |

OTHER PUBLICATIONS

Machine Design, vol. 52, No. 13, Jun. 1980, Cleveland Ohio, USA, pp. 113–116 Database WPIL, Derwent Publications Ltd., London, GB; AN 90–213243 (28).

*Primary Examiner*—Karen A. Dean
*Attorney, Agent, or Firm*—Armstrong, Westerman Hattori, McLeland & Naughton

[57] ABSTRACT

A curable composition is disclosed and comprises the following components.

(A) 100 parts by weight of a oxypropylene polymer having a polymer main chain containing a repeating unit represented by the following formula

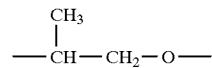

and having at least one group containing a silicon atom bonded to a hydroxyl group and/or a hydrolyzable group and capable of crosslinking by forming a siloxane bond, wherein Mw/Mn thereof is not more than 1.6 and the number average molecular weight is at least 6,000, (B) from 1 to 200 parts by weight of a filler having a BET specific surface area of not higher than 10 m$^2$/g, and (C) from 0.1 to 20 parts by weight of a curing catalyst, said composition containing substantially no plasticizer.

7 Claims, No Drawings

CURABLE COMPOSITION BASED ON OXYPROPYLENE POLYMER

This is a continuation of parent application Ser. No. 08/207,256 filed Mar. 8, 1994 now abandoned, which is a continuation of application Ser. No. 07/941,320, filed Sep. 4, 1992, now abandoned.

FIELD OF THE INVENTION

The present invention relates to a curable composition comprising a oxypropylene polymer having a group containing a silicon atom bonded to a hydroxyl group and/or a hydrolyzable group and capable of crosslinking by forming a siloxane bond.

BACKGROUND OF THE INVENTION

Oxyalkylene series polymers each having a reactive silicon group are disclosed in JP-A-52-73998 (the term "JP-A" as used herein means an "unexamined published Japanese patent application"), U.S. Pat. No. 3,971,751, etc., and a typical example thereof is a polymer represented by the following formula;

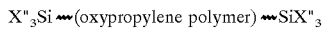

wherein X" represents a hydrolyzable group such as a methoxy group, etc.

A oxyalkylene series polymer having a reactive silicon groups cures by forming a siloxane bond (Si—O—Si) between the polymer molecules by function of moisture in air at room temperature to obtain a rubbery cured material.

Since the cured products exhibit excellent elongation properties, strength, adhesion, etc., the material is used as a sealant, adhesives, so on. The polymer may be used in a form of a composition by mixing with a filler to save material cost. The composition, however, is liable to substantially increase in viscosity, accordingly, a plasticizer is technically essential to be incorporated into the composition.

On the other hand, use of the plasticizer has various problems due to evaporation and shifting the material. For instances, the problems include softening of the composition due to shifting the material to the substrate, causing cracks of the products, softening of a paint when the paint is coated over the products, contamination of the products due to adhesion, and also lowering of the adhesive property and the flexibility of coating with the passage of time, etc.

SUMMARY OF THE INVENTION

According to the present invention, there is provided a substantially plasticizer-free curable composition comprising;

(A) a oxypropylene polymer having a polymer main chain containing a repeating unit represented by the formula;

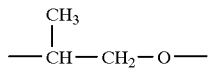

and at least one reactive silicon group, wherein Mw/Mn is not more than 1.6 and a number average molecular weight is at least 6,000.

(B) a filler having a BET specific surface area of not more than 10 m$^2$/g, and (C) a curing catalyst.

DETAILED DESCRIPTION OF THE INVENTION

The present invention is described in detail as follows.

There is no particular restriction on the reactive silicon group contained in the oxypropylene polymer (A) but typical examples are the groups represented by following formula (I);

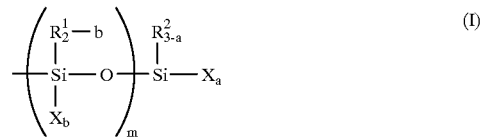

wherein, $R^1$ and $R^2$ each represents an alkyl group having from 1 to 20 carbon atoms, an aryl group having 6 to 20 carbon atoms, an aralkyl group having from 7 to 20 carbon atoms, or a triorganosiloxy group represented by $(R')_3$SiO—(wherein R' represents a monovalent hydrocarbon group having from 1 to 20 carbon atoms and three R's may be the same or different), when two or more said $R^1$ and $R^2$ exist, they may be the same or different; X represents a hydroxy group or a hydrolyzable group, and when two or more Xs exist, they may be the same or different; "a" represents an integer of from 0 to 3; and "b" represents an integer of from 0 to 2; "b"s in the "m" groups

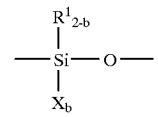

may be the same or different; "m" represents an integer of from 0 to 19, and "a" and "b" satisfy the relationship a+Σb≧1.

There is no particular restriction on the hydrolyzable group, represented by X, and conventionally known hydrolyzable groups can be used in this invention. Specific examples thereof are a hydrogen atom, a halogen atom, an alkoxyl group, an acyloxy group, a ketoxymate group, an amino group, an amido group, an acid amido group, an aminoxy group, a mercapto group, and an alkenyloxy group. In these groups, a hydrogen atom, an alkoxy group, an acyloxy group, a ketoxymate group, an amino group, an amido group, an aminoxy group, a mercapto group, and an alkenyloxy group are preferable, and also from the view point that the hydrolysis is moderate and hence the compound can be easily handled, alkoxy groups such as methoxy, etc., are particularly preferable.

One to three of the hydrolyzable groups or hydroxy groups may bond to one silicon atom and (a+Σb) is preferably from 1 to 5. When two or more hydrolyzable groups or hydroxy groups exist in the reactive silicon group, they may be the same or different.

The number of silicon atom(s) existing in the reactive silicon group may be 1 or 2 or more and in the case of the reactive silicon group to which silicon atoms are bonded by siloxane bonds, etc., about 20 silicon atoms may exist.

In addition, the reactive silicon group represented by the following formula is preferable from the point of easy availability;

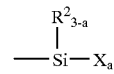

Wherein $R^2$, X, and a have the same meaning as described above.

Also, typical examples of $R^1$ and $R^2$ in formula (I) described above are an alkyl group such as methyl, ethyl, etc., a cycloalkyl group such as cyclohexyl, etc., an aryl group such as phenyl, etc., an aralkyl group such a benzyl etc., and a triorganosiloxy group shown by (R')₃SiO—, wherein R' is methyl, phenyl, etc. R¹, R², and R' are particularly preferably a methyl group.

It is preferable that at least one, and preferably from 1.1 to 5 reactive silicon groups exist in one molecule of the oxypropylene polymer. If a number of the reactive silicon group contained in one molecule of the polymer is less than 1, a curability of the curable composition becomes insufficient and a good rubbery elastic behavior is difficult to obtain.

The reactive silicon group(s) may exist at the terminal(s) of the molecular chain of the oxypropylene polymer or may exist in the inside thereof. When the reactive silicon group exists at the terminal position of the molecular chain, an amount of the effective network chains of the oxypropylene polymer component contained in the cured product finally formed is increased, whereby a rubbery cured product showing a high strength, a high elongation, and a low elasticity is obtained.

The oxypropylene polymer constituting the polymer main chain in component (A) for use in the present invention has the repeating unit shown by the following formula;

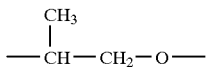

These oxypropylene polymers may be straight chain ones or branched ones, or may be a mixture of the straight chain one and the branched one. Also, the oxypropylene polymer may contain other monomer units but in this case, it is preferred that the monomer unit (the repeating unit) shown by the above formula exists in the polymer in an amount of at least 50% by weight, and more preferably at least 80% by weight.

It is preferable that the reactive silicon group-containing oxypropylene polymer having Mw/Mn of not higher than 1.6 and a number average molecular weight of at least 6,000 used as component (A) in the present invention is obtained by introducing the reactive silicon group(s) into a oxypropylene polymer.

The oxypropylene polymer having a functional group, which is used for the foregoing purpose can be obtained by ring-opening-polymerization of a corresponding propylene oxide.

As a method of polymerizing propylene oxide, there are;
(a) a method of using an alkali catalyst such as sodium hydroxide, potassium hydroxide, sodium alkoxide, potassium alkoxide, etc.,
(b) a method of using a metal catalyst such as an aluminum porphiline complex, composite metals, a cyanide complex, etc.

Furthermore, the oxypropylene polymer can be also obtained by;
(c) a method of reacting a oxypropylene polymer once obtained by a polymerization and a compound having two or more functional groups capable of reacting the terminal group(s) of the oxypropylene polymer.

In the foregoing methods, by the method (a), a oxypropylene polymer having a large molecular weight is not obtained, furthermore, a oxypropylene polymer having a large molecular weight obtained by the method (c) is disadvantageous since there is a tendency of broadening the molecular weight distribution, and hence the method (b) is advantageous.

In addition, since by the introduction of the reactive silicon groups into the oxypropylene polymer, the molecular weight distribution tends to become broader than the polymer before the introduction of the reactive silicon groups, the molecular weight distribution of the polymer before the introduction of the reactive silicon groups is preferably as narrow as possible.

The reactive silicon groups may be introduced by a known method. There are, for example, the following methods.

(1) A oxypropylene polymer having functional groups such as a hydroxy group, etc., at the terminal position is reacted with an organic compound having an active group showing a reactivity to the functional group and an unsaturated group, and then the reaction product is hydrosilylated by acting therewith a hydrosilane having a hydrolyzable group.

(2) A oxypropylene polymer having functional groups (hereinafter, is referred to as Y functional group) such as a hydroxyl group, an epoxy group, an isocyanate group, etc., at the terminal group is reacted with a compound having a functional group (hereinafter, is referred to as Y' functional group) showing a reactivity to the Y functional group and a reactive silicon group.

Specific examples of the silicon compound having the Y' functional groups are an amino group-containing silanes such as γ-(2-aminoethyl)aminopropyltrimethoxysilane, γ-(2-amino-ethyl)aminopropylmethyldimethoxysilane, γ-aminopropyl-triethoxysilane, etc.; mercapto group-containing silanes such as γ-mercaptopropyltrimethoxysilane, γ-mercaptopropylmethyl-dimethoxysilane, etc.; epoxy silanes such as γ-glycidoxypropyltrimethoxysilane, β-(3,4-epoxycyclohexyl)ethyltrimethoxysilane, etc.; vinyl type unsaturated group-containing silanes such as vinyltriethoxysilane, γ-methacryloyloxypropyltrimethoxysilane, γ-acryloyloxypropylmethyldimethoxysilane, etc; chlorine atom-containing silanes such as γ-chloropropyltrimethoxysilane, etc.; isocyanate-obtaining silane such as γ-isocyanatopropyltriethoxysilane, γ-isocyanatopropylmethyldimethoxysilane, etc.; and hydrosilanes such as methyldimethoxysilane, trimethoxysilane, methyldiethoxysilane, etc., although the silicon compounds having the Y' functional groups for use in this invention are not limited to these compounds.

In the foregoing method (1) or (2), the method of reacting a oxypropylene polymer having a hydroxy group at the terminal position and a compound having an isocyanate group and a reactive silicon group is preferred from the view point of ease of the synthesis.

The number average molecular weight (Mn) of the reactive silicon-containing oxypropylene polymer, which is component (A) of the curable composition of the present invention is effectively at least 6,000, preferably from 6,000 to 60,000, and more preferably from 7,000 to 30,000. Such oxypropylene polymers are described in JP-B-3-79627, etc., (the term "JP-B" as used herein means an "examined published Japanese patent publication").

Furthermore, in the foregoing reactive silicon-containing oxypropylene polymer, the ratio (Mw/Mn) of the weight average molecular weight (Mw) to the number average molecular weight (Mn) is not higher than 1.6 and thus the molecular weight distribution is very narrow (the monomer has mono-dispersibility). The value of (Mw/Mn) is preferably not higher than 1.5, and more preferably not higher than 1.4. In addition, the molecular weight distribution can be measured by various methods but is usually measured by a gel permeation chromatographic (GPC) method.

As described above, since the oxypropylene polymer being used in the present invention has a narrow molecular weight distribution in spite of the large number average molecular weight, the composition containing the polymer shows a good viscosity behavior, shows excellent processing property and workability in spite of containing substantially no plasticizer, and does not show various faults based on a plasticizer.

A filler being used as component (B) in the present invention is not limited to specific fillers and ordinary fillers can be used. Practical examples thereof are reinforcing fillers such as fumed silica, precipitated silica, silicic anhydride, silicic hydrate, carbon black, etc.; fillers such as calcium carbonate, magnesium carbonate, diatomaceous earth, calcined clay, clay, talc, titanium oxide,bentonite, organic bentonite, ferric oxide, zinc oxide, activated zinc white, and organic fillers (e.g., hydrogenated castor oil, polyvinyl chloride, and polyolefin); fibrous fillers such as asbestos, glass fibers, glass filaments, etc.; and inorganic and organic hollow microspheres, such as Sirasu (one kind of volcanic ashes) hollow microspheres, glass hollow microspheres, Saran hollow microspheres, phenol hollow microspheres, etc.

Fillers may be used singly or as a mixture thereof. Also, the filler for use in the present invention is not limited to the foregoing specific fillers and may be selected according to the desired characteristics of the curable composition of the present invention. However, in general, it is preferred to use at least one kind of a filler having a BET specific surface area of not more than 10 $m^2/g$, and preferably not more than 5 $m^2/g$ from the points of improving the mechanical characteristics and of the viscosity.

From the above-described view points and also the points of cost and the easy availability, preferred fillers are calcium carbonate, a vinyl chloride(paste) resin, hollow microspheres.

It is preferable that the filler is used in an amount of from 1 to 200 parts by weight (hereinafter, is referred to as simply "parts"), and particularly from 5 to 200 parts to 100 parts of the reactive silicon-containing oxypropylene polymer. Also, as described above, it is preferable to use at least one kind of a filler having a BET specific surface area of not more than 10 $m^2/g$. In the case of using fillers, it is preferable that the filler having a BET specific surface area of not more than 10 $m^2/g$ exists in an amount of at least 10% by weight of the whole fillers. The BET specific surface area is the surface area calculated by a BET method.

There is no particular restriction on the curing catalyst used as component (C) of the curable component of the present invention and practical examples thereof are silanol condensation catalysts, e.g., titanic acid esters such as tetrabutyl titanate, tetrapropyl titanate, etc.; tin carboxylates such as dibutyltin dilaurate, dibutyltin maleate, dibutyltin diacetate, tin octylate, tin naphthenate, etc.; the reaction products of dibutyltin oxide and phthalic acid esters; dibutyltin diacetylacetate; organic aluminum compounds such as aluminum trisacetylacetonate, aluminum trisethylacetoacetate, diisopropoxyaluminum ethylacetoacetate, etc.; chelate compounds such as zirconium tetraacetylacetonate, titanium tetraacetylacetonate, etc.; lead octylate; amine series compounds such as butylamine, octylamine, laurylamine, dibutylamine, monoethanolanine, diethanolamine, triethanol-amine, diethylenetriamine, triethylenetetramine, oleylamine, cyclohexylamine, benzylamine, diethylaminopropylamine, xylenediamine, triethyleneamine, guanidine, diphenylguanidine, 2,4,6-tris(dimethylaminomethyl)phenol, morpholine, N-methylmorpholine, 2-ethyl-4-methyl imidazole, 1,8-diazabicyclo(5,4,O)undecene-7 (DBU), etc.; the salts of these amine series compounds and carboxylic acids, etc.; low molecular weight polyamide resins obtained from excessive polyamine and polybasic acids; reaction products of excessive polyamine and epoxy compounds; and silane coupling agents having an amino group, such as γ-aminopropyltrimethoxysilabe, N-(B-aminoethyl) aminopropylmethyl dimethoxysilane, etc.; and known silanol condensation catalysts such as other acidic catalysts, basic catalysts, etc. These catalysts may be used singly or as a mixture.

The amount of the curing catalyst is preferably from about 0.1 to 20 parts, and more preferably from about 1 to 10 parts to 100 parts of the reactive silicon group-containing oxypropylene polymer. If the amount of the curing catalyst is too small relative to the reactive silicon group-containing oxypropylene polymer, the curing speed is delayed and also the curing reaction is impeded, which are undesirable. On the other hand, if the amount of the curing catalyst is too large relative to the reactive silicon group-containing oxypropylene polymer, local heating and foaming occur at hardening, whereby a good cured product is difficult to obtain, which is also undesirable.

In the case of using the curable composition of the present invention, if necessary, various kinds of additives such as an adhesion improving agent, a property controlling agent, a storage stability improving agent, an aging inhibitor, a ultraviolet absorbent, a metal inactivating agent, an ozone deterioration inhibitor, a light stabilizer, an amine series radical chain inhibitor, a phosphorus series peroxide decomposing agent, a lubricant, a pigment, a foaming agent, etc., can be properly added to the polymer.

There is no particular restriction on the preparation method of the curable composition of the present invention and, for example, an ordinary method comprises compounding the foregoing components and kneading the compounded mixture at room temperature or under heating using a mixer, rolls, a kneader, etc., or dissolving the foregoing components in a small amount of a solvent and mixing them. Also, by suitably combining these components they can be used as one part type or two part type compounds.

When the curable composition of the present invention is exposed in the air, the composition forms a three-dimensional network structure by the action of moisture and is cured into a solid having a rubbery elasticity.

The curable composition of the present invention is particularly useful as an elastic sealant and can be used as a sealant for buildings, ships, motor cars, roads, etc. The curable composition of this invention can adhere closely to wide range of substrates, such as glasses, porcelains, woods, metals, resin moldings, etc., or to such primed substrates.

Moreover, the curable composition of this invention is also useful as tackifiers, coating compositions, coating water-proofing agents, food packing materials, casting rubber materials, molding materials, foaming materials, etc.

As described above, according to the present invention, a curable composition is capable of overcoming various difficulties based on a plasticizer.

The following examples are intended to make more clear the present invention but not limit it in any way.

SYNTHESIS EXAMPLE 1

In a 1.5 liter vessel made of pressure-resisting glass was placed 401 g (0.122 equivalent) of polyoxypropylene triol having a molecular weight of 10,000 (Mw/Mn=1.2, viscosity 28 poises) and the inside atmosphere was changed into a nitrogen atmosphere.

Then, 28.7 g (0.149 equivalent) of a methanol solution of 28% sodium methoxide was added dropwise thereto from a dropping funnel at 137° C. and after reacting for 5 hours, the solvent was evaporated off under reduced pressure. Then, under a nitrogen atmosphere again, 13.5 g (0.177 equivalent) of allyl chloride was added dropwise to the residue and after reacting for 1.5 hours, the reaction mixture was further allylated using 8.4 g (0.0435 equivalent) of a methanol solution of 28% sodium methoxide and 4.1 g (0.0525 equivalent) of allyl chloride.

The reaction mixture was dissolved in hexane and after absorption-treating the solution with aluminum silicate, hexane was removed under reduced pressure to provide 311 g of a yellow transparent polymer (viscosity 24 poises).

Then, 270 g (0.0975 equivalent) of the polymer thus obtained was placed in a reaction vessel made of pressure resisting glass and the inside atmosphere was changed to a nitrogen atmosphere. After adding thereto 0.075 ml of a catalyst solution of chloroplatinic acid (solution of 25 g of $H_2PtCl_6.6H_2O$ dissolved in 500 g of isopropyl alcohol), the resultant mixture was stirred for 30 minutes. To the reaction mixture was added 8.67 g (0.0820 equivalent) of dimethoxymethyl silane from a dropping funnel and after carrying out the reaction for 4 hours at 90° C., volatile matters were removed to provide 260 g of a yellow transparent polymer.

SYNTHESIS EXAMPLE 2

In a flask equipped with a stirrer were charged 220 g (0.0667 equivalent) of polyoxypropylene triol having a number average molecular weight of 10,000 (Mw/Mn=1.2, viscosity 28 poises) and 0.02 g of dibutyltin dilaurate and then, 12.6 g (0.667 equivalent) of γ-isocyanatopropylmethyldimethoxysilane was added dropwise to the mixture at room temperature under a nitrogen atmosphere. Thereafter, the reaction was carried out for 1.5 hours at 75° C. The infrared (IR) spectra of the product were measured and after confirming the vanishing of the NCO absorption near 2280 cm$^{-1}$ and the formation of the C=O absorption near 1730 cm$^{-1}$, the reaction was finished. Thus, 213 g of a colorless transparent polymer was obtained.

COMPARATIVE SYNTHESIS EXAMPLE 1

In a nitrogen gas-replaced reaction vessel made of pressure resisting glass were charged 420 g of polyoxypropylene glycol having a number average molecular weight of 3,000 and 80 g of polyoxypropylene triol having a number average molecular weight of 3,000. Then, 40 g of sodium hydroxide was added to the mixture and after carrying out the reaction for 13 hours at 60° C., 12.7 g of bromochloromethane was reacted with the reaction mixture thus obtained for 10 hours at 60° C. (Mw/Mn of the polymer obtained was 2.0 and the viscosity thereof was 222 poises.)

Then, 15 g of allyl chloride was added to the polymer followed by carrying out the reaction for 36 hours. After the reaction was over, volatile matters were removed under reduced pressure.

The content of the reaction vessel was transferred into a beaker and dissolved in hexane. After subjecting the solution to an absorption treatment with aluminum silicate, hexane was removed under reduced pressure.

In a nitrogen gas-replaced reaction vessel was charged 500 g of the polymer and after adding thereto 0.03 g of a catalyst solution of chloroplatinic acid (a solution of 25 g of $H_2PtCl_6.6H_2O$ dissolved in 500 g of isopropyl alcohol), 18 g of dimethoxymethylsilane was added thereto, followed by carrying out the reaction for 4 hours at 80° C. After the reaction was over, volatile matters were removed under reduced pressure to provide 550 g of a light-yellow transparent polymer.

The viscosity of each of the polymers obtained in Synthesis Examples 1 and 2 and Comparative Synthesis Example 1 was measured at 23° C. using a B-type viscometer (BM Type Rotor No. 4, 12 r.p.m.). Also, the number average molecular weight (Mn) and the molecular weight distribution (Mw/Mn) of each polymer were analyzed by GPC. The analysis by GPC was carried out using a column packed with a polystyrene gel (made by Tosoh Corporation) and using tetrahydrofuran as an effluent at an open temperature of 40° C.

The results obtained are shown in Table 1.

TABLE 1

| Polymer | Viscosity (poise) | Number Average Molecular Weight (Mn) | Molecular Weight Distribution (Mw/Mn) |
|---|---|---|---|
| Synthesis Example 1 | 30 | $1.3 \times 10^4$ | 1.2 |
| Synthesis Example 2 | 48 | $1.3 \times 10^4$ | 1.2 |
| Comparative Synthesis Example 1 | 230 | $1.2 \times 10^4$ | 2.1 |

EXAMPLES 1 AND 2 AND COMPARATIVE EXAMPLE 1

To 100 part of each of the polymers obtained in Synthesis Examples 1 and 2 and Comparative Synthesis Example 1 were added 30 parts of colloidal calcium carbonate ("Hakuenka CCR", trade name, made by Shiraishi Kogyo K.K., BET specific surface area 18 m$^2$/g), 90 parts of heavy calcium carbonate ("Whiton SB", trade name, made by Shiraishi Kogyo K.K., BET specific surface area 2.5 m$^2$/g), 2 parts of an aging inhibitor, and 4 parts of titanium dioxide ("R-820", trade name, made by Ishihara Sangyo Kaisha, Ltd.), and after kneading well the mixture by means of three paint rolls, 3 parts of dibutyltin dilaurate and 2 parts of aminosilane ("A-1120", trade name, made by Nippon Unicar K.K.) were added to the kneaded mixture followed by uniformly kneading to provide each curable composition.

In this case, the composition of Example 1 (prepared using the polymer of Synthesis Example 1) and the composition of Example 2 (prepared using the polymer of Synthesis Example 2) had lower viscosities than the composition of Comparative Example 1 (prepared using the polymer of Comparative Synthesis Example 1) and could be easily handled.

Also, after forming a sheet of 2 mm in thickness using each of these compositions, each sheet was cured for 7 days at 23° C. to provide a sheet-form cured product.

On each cured product was coated an aqueous acrylic paint ("Aqueous Top", trade name, made by Nippon Paint Co., Ltd.) or a solvent-type alkyd paint ("House Paint", trade name, made by Rock Paint K.K.), after allowing the coated products to stand outdoor for one month, the tackiness of the surface (i.e., the migration of a plasticizer into the paint) was evaluated by a finger touch and also the dust attaching extent was visually evaluated.

Reference examples were prepared, by following the same procedures as the foregoing examples and comparative example except that 50 parts of a plasticizer, dioctyl phthalate (DOP) was used. Sheet-form cured products were obtained and they were also evaluated as described above.

The results obtained are shown in Table 2 below.

In Table 2, the workability was evaluated based on the height of stringing with a spatulus and the viscosity, wherein a good workability was shown by mark ☻, a slightly good one by mark o, and an inferior one by mark x.

The tackiness was evaluated by a finger touch method, wherein one showing no tackiness was shown by mark ☻, one showing a slight tackiness by mark o, and one (surface) showing a strong tackiness by x.

The dust attaching property was visually evaluated, wherein one having no attached dust was shown by mark A, one having slightly attached dust by mark B, and one having the dirty surface with dust by mark C.

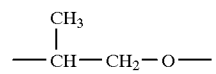

and having at least one group containing a silicon atom bonded to a hydroxyl group and/or a hydrolyzable group and capable of crosslinking by forming a siloxane bond, wherein Mw/Mn of the liquid oxypropylene polymer is not more than 1.6 and its number average molecular weight is from 6,000 to 60,000, (B) from 1 to 200 parts by weight of a filler having a BET specific surface area of not higher than 10 m2/g, and (C) from 0.1 to 20 parts by weight of a curing catalyst, said composition containing substantially no plasticizer.

2. The curable composition of claim 1, wherein said group having a silicon atom bonded to a hydroxyl group and/or a

TABLE 2

|  | Polymer A (part) | Plasticizer (part) | Workability | Tackiness | | Dust Attaching Property | |
|---|---|---|---|---|---|---|---|
|  |  |  |  | Aqueous acrylic paint | Solvent-type alkyd paint | Aqueous acrylic paint | Solvent-type alkyd paint |
| Example 1 | Synthesis 1 100 | 0 | o | ☻ | ☻ | A | A |
| Example 2 | Synthesis 1 100 | 0 | o | ☻ | ☻ | A | A |
| Comparative Example 1 | Comparative Synthesis 1 100 | 0 | x | ☻.o | ☻ | B | B |
| Reference Example 1 | Synthesis 1 100 | 50 | ☻ | x | x | C | C |
| Reference Example 2 | Synthesis 2 100 | 50 | ☻ | x | x | C | C |
| Reference Example 3 | Comparative Synthesis 1 100 | 50 | ☻ | x | x | C | C |

As is clear from the results shown in Table 2, it can be seen that in the case of using an oxypropylene polymer having a broad molecular weight distribution, the viscosity of the curable composition prepared using the polymer becomes high and the workability becomes extremely inferior unless a plasticizer is used, on the other hand, in the case of using an oxypropylene polymer having a narrow molecular weight distribution, the curable composition has a low viscosity and shows a good workability without using a plasticizer.

Also, since the curable composition of this invention contains no plasticizer, the problems caused by the use of a plasticizer (e.g., the migration of a plasticizer into a paint or a coating composition) do not occur as is also clear from Table 2.

While the invention has been described in detail and with reference to specific embodiments thereof, it will be apparent to one skilled in the art that various changes and modifications can be made therein without departing from the spirit and scope thereof.

What is claimed is:

1. A curable composition comprising (A) 100 parts by weight of a liquid oxypropylene polymer having a polymer main chain containing a repeating unit represented by the following formula hydrolyzable group is a group represented by the following formula (I)

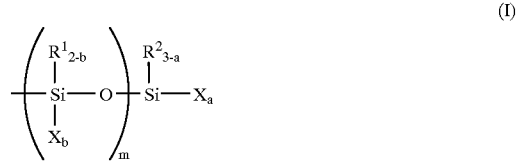

wherein $R^1$ and $R^2$ each represents an alkyl group having from 1 to 20 carbon atoms, an aryl group having from 6 to 20 carbon atoms, an aralkyl group having from 7 to 20 carbon atoms, or a triorganosiloxy group represented by $(R')_3SiO$— (wherein R' represents a univalent hydrocarbon group having from 1 to 20 carbon atoms and the three R' groups may be the same or different), when two or more $R^1$ groups and $R^2$ groups are present, $R^1$ and $R^2$ may be the same or different; X represents a hydroxyl group or a hydrolyzable group, and when two or more X groups are present, the X groups may be the same or different; a represents an integer of from 0 to 3; b represents an integer of from 0 to 2, the integers b in the m number of groups shown by the following formula

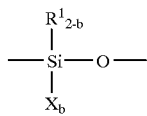

may be the same or different; and m represents an integer of from 0 to 19, said m satisfying the relationship $a+\Sigma b \leq 1$.

3. The curable composition of claim 1, wherein said group having a silicon atom bonded to a hydroxyl group and/or a hydrolyzable group and capable of crosslinking by forming a siloxane bond is a group represented by the following formula

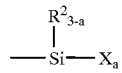

wherein $R^2$, X, and a have the same respective meanings as ascribed in claim 2.

4. The curable composition of claim 1, wherein said group having a silicon atom bonded to a hydroxyl group and/or a hydrolyzable group and capable of crosslinking by forming a siloxane bond are present at the terminal position of the molecular chain of the polymer.

5. The curable composition of claim 1, wherein Mw/Mn of the polymer as component (A) is not more than 1.5.

6. The curable composition of claim 1, wherein Mw/Mn of the polymer as component (A) is not more than 1.4.

7. The curable composition of claim 1, wherein the BET specific surface area of the filler is not higher than 5 m2 /g.

* * * * *